United States Patent
Lection et al.

(10) Patent No.: US 7,386,783 B2
(45) Date of Patent: Jun. 10, 2008

(54) METHOD, SYSTEM AND PROGRAM PRODUCT FOR CONTROLLING WEB CONTENT USAGE

(75) Inventors: David B. Lection, Raleigh, NC (US); Eric L. Masselle, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 10/425,107

(22) Filed: Apr. 28, 2003

(65) Prior Publication Data
US 2004/0216034 A1    Oct. 28, 2004

(51) Int. Cl.
G06F 17/00    (2006.01)
(52) U.S. Cl. .................. 715/203; 715/234; 709/203; 709/219; 709/246
(58) Field of Classification Search ............. 715/500.1, 715/513, 203, 234, 240, 243; 709/225, 230, 709/203, 217, 246, 248, 219; 707/104.1, 707/4, 9, 10; 713/201; 705/14, 44
See application file for complete search history.

(56) References Cited

U.S. PATENT DOCUMENTS

| | | | |
|---|---|---|---|
| 5,649,186 A | 7/1997 | Førguson | 707/10 |
| 5,884,312 A | 3/1999 | Dustan et al. | 707/10 |
| 5,970,485 A | 10/1999 | Sugaya et al. | 707/4 |
| 5,987,440 A | 11/1999 | O'Neil et al. | 705/44 |
| 6,029,182 A * | 2/2000 | Nehab et al. | 715/523 |
| 6,128,655 A * | 10/2000 | Fields et al. | 709/219 |
| 6,199,081 B1 * | 3/2001 | Meyerzon et al. | 715/210 |
| 6,208,975 B1 | 3/2001 | Bull et al. | 705/14 |
| 6,240,455 B1 * | 5/2001 | Kamasaka et al. | 709/229 |
| 6,253,326 B1 * | 6/2001 | Lincke et al. | 726/12 |
| 6,298,446 B1 * | 10/2001 | Schreiber et al. | 726/27 |
| 6,363,479 B1 * | 3/2002 | Godfrey et al. | 713/160 |
| 6,366,923 B1 | 4/2002 | Lenk et al. | 707/104.1 |
| 6,381,602 B1 | 4/2002 | Shoroff et al. | 707/9 |
| 6,430,624 B1 * | 8/2002 | Jamtgaard et al. | 709/246 |
| 6,453,329 B1 * | 9/2002 | Dodgen | 715/516 |
| 6,453,339 B1 * | 9/2002 | Schultz et al. | 709/206 |
| 6,594,682 B2 * | 7/2003 | Peterson et al. | 718/102 |

(Continued)

OTHER PUBLICATIONS

Scott Dewitt, "Basic Web Clipping Using WebSphere Portal Version 4.1", http://www7b.software.ibm.com, Jun. 2002, pp. 1-14.

(Continued)

*Primary Examiner*—Doug Hutton
*Assistant Examiner*—James H Blackwell
(74) *Attorney, Agent, or Firm*—Gerald R. Woods; Hoffman, Warnick & D'Alessandro LLC

(57) ABSTRACT

Under the present invention, control tags are attached to web content at a content source. The control tags are used to control use of the web content on a portal page. Specifically, a first type of control tag that can be attached to be content under the present invention is an exclusionary tag. Once attached, the exclusionary tag prevents the web content from being used on the portal page. A second type of control tag that can be attached to web content under the present invention is a set of grouping tags. The set of grouping tags can be used to require certain sections of the web content to be used/grouped together on the web page.

12 Claims, 5 Drawing Sheets

U.S. PATENT DOCUMENTS

| | | | |
|---|---|---|---|
| 6,643,661 B2* | 11/2003 | Polizzi et al. | 707/100 |
| 6,675,350 B1* | 1/2004 | Abrams et al. | 715/501.1 |
| 6,701,350 B1* | 3/2004 | Mitchell | 709/217 |
| 6,715,129 B1* | 3/2004 | Hind et al. | 715/513 |
| 6,725,425 B1* | 4/2004 | Rajan et al. | 715/513 |
| 6,735,586 B2* | 5/2004 | Timmons | 707/3 |
| 6,754,888 B1* | 6/2004 | Dryfoos et al. | 717/127 |
| 6,763,388 B1* | 7/2004 | Tsimelzon | 709/228 |
| 6,781,609 B1* | 8/2004 | Barker et al. | 715/760 |
| 6,826,594 B1* | 11/2004 | Pettersen | 709/203 |
| 6,931,599 B1* | 8/2005 | Korenshtein | 715/762 |
| 6,966,028 B1* | 11/2005 | Beebe | 715/517 |
| 6,981,213 B2* | 12/2005 | Barmettler | 715/513 |
| 6,983,331 B1* | 1/2006 | Mitchell et al. | 709/246 |
| 2001/0025281 A1 | 9/2001 | Hirayama | 707/9 |
| 2001/0037405 A1 | 11/2001 | Sideek | 709/246 |
| 2002/0015496 A1* | 2/2002 | Weaver et al. | 380/241 |
| 2002/0018078 A1* | 2/2002 | Khan et al. | 345/762 |
| 2002/0029304 A1* | 3/2002 | Reynar et al. | 709/332 |
| 2002/0049792 A1* | 4/2002 | Wilcox et al. | 707/522 |
| 2002/0059441 A1* | 5/2002 | Hasegawa | 709/232 |
| 2002/0059586 A1* | 5/2002 | Carney et al. | 725/35 |
| 2002/0065939 A1 | 5/2002 | Liu | 709/248 |
| 2002/0066027 A1* | 5/2002 | Johnson et al. | 713/201 |
| 2002/0069365 A1 | 6/2002 | Howard et al. | 713/201 |
| 2002/0133566 A1 | 9/2002 | Teeple | 709/218 |
| 2002/0169875 A1 | 11/2002 | Furui et al. | 709/225 |
| 2002/0174241 A1 | 11/2002 | Beged-Dov et al. | 709/230 |
| 2002/0194592 A1* | 12/2002 | Tsuchida et al. | 725/32 |
| 2002/0194595 A1* | 12/2002 | Miller et al. | 725/36 |
| 2002/0198909 A1* | 12/2002 | Huynh et al. | 707/513 |
| 2003/0056218 A1* | 3/2003 | Wingard et al. | 725/46 |
| 2003/0061309 A1* | 3/2003 | Brown et al. | 709/218 |
| 2003/0061567 A1* | 3/2003 | Brown et al. | 715/507 |
| 2003/0065745 A1* | 4/2003 | Wolfe et al. | 709/219 |
| 2003/0084404 A1* | 5/2003 | Dweck et al. | 715/513 |
| 2003/0093792 A1* | 5/2003 | Labeeb et al. | 725/46 |
| 2003/0101412 A1* | 5/2003 | Eid | 715/513 |
| 2003/0110272 A1* | 6/2003 | du Castel et al. | 709/229 |
| 2003/0167442 A1* | 9/2003 | Hagerty et al. | 715/501.1 |
| 2004/0168121 A1* | 8/2004 | Matz | 715/513 |
| 2004/0181750 A1* | 9/2004 | Lection et al. | 715/513 |
| 2004/0261096 A1* | 12/2004 | Matz | 725/28 |

OTHER PUBLICATIONS

Ross et al., "A Composable Framework for Secure Multi-Modal Access to Internet Services from Post-PC Devices", 2002 Kluwer Academic Publishers, Manufactured in the Netherlands, Mobile Networks and Applications 7, pp. 389-406.

\* cited by examiner

66A —<CLIP-GROUP>

62A — Here are todays Sports Scores: PGH 24, BOE 21, WAS 14, WPS 34

68A —<CLIP-GROUP>

62B —<P>We are having a bake sale in the cafeteria at 9AM today</P>

68B —</CLIP-GROUP>

62C —Copyright 2002, XYZ Corporation

66B —</CLIP-GROUP>

72 — `<CLIP-GROUP SETS="1,3; 2,3; 1,2,3">`

70A — `<CLIP-GROUP ID="1">`

62A — Here are todays Sports Scores: PGH 24, BOE 21, WAS 14, WPS 34

`</CLIP-GROUP>`

70B — `<CLIP-GROUP ID="2">`

62B — `<P>`We are having a bake sale in the cafeteria at 9AM today`</P>`

`</CLIP-GROUP>`

70C — `<CLIP-GROUP ID="3">`

62C — Copyright 2002, XYZ Corporation

`</CLIP-GROUP>`

METHOD, SYSTEM AND PROGRAM PRODUCT FOR CONTROLLING WEB CONTENT USAGE

BACKGROUND OF THE INVENTION

1. Field of the Invention

The present invention generally relates to a method, system and program product for controlling web content usage. Specifically, under the present invention, a control tag is attached to web content at a content source to limit use of the web content on a portal page.

2. Related Art

As computer technology continues to advance, computer users are increasingly turning to the World Wide Web for information. To this extent, web portal pages have become an increasingly popular means of delivering aggregated, personalized content to computer users. As known in the art, a portal page includes sections or "visual portlets" that each contain particular web content formatted according to a user's preferences. For example, a user could establish a personalized portal page (e.g., MY.YAHOO.COM) that has sections for news, weather, sports, etc. Typically, a portal page is rendered and delivered to a user from a portal server. A portal program such as WebSphere Portal Server, which is commercially available from International Business Machines Corp. of Armonk, N.Y. is loaded on the portal server to obtain web content from a content source. Once obtained, the portal program will aggregate the web content into a portal page according to the user's preferences. One popular method of obtaining web content from a content source is known as "web clipping." In general, web clipping allows sections of web content to be clipped from a larger body of web content. For example, if a content source has a news article that includes both a bar graph and a textual description, a web clipper within the portal program could allow the bar graph to be clipped from the news article separate from the textual description. Once clipped, the bar graph could be included on the portal page.

One problem with current portal technology is the lack of control a content source can exhibit over use of web content on a portal page. For example, a content source could prefer that the textual description accompany the bar graph so that none of the information is taken out of context. Alternatively, a content source could prefer that a copyright or other legal notice accompany any web content that is clipped. Still yet, a content source could have a set of policies that limits the clipping of web content (e.g., adult material, etc.). In all of these instances, the content sources must rely on the portal server (or administrators thereof) to ensure that such preferences are adhered to. Specifically, there is currently no mechanism for the content sources to effectively control the use of their web content.

In view of the foregoing, there exists a need for a method, system and program product for controlling web content usage. Specifically, a need exists for a system that allows a content source to attach a control tag to web content. A further need exists for a control tag that prevents web content from being used on a portal page. Still yet, a need exists for a control tag that causes multiple sections of web content to be used together on a portal page.

SUMMARY OF THE INVENTION

In general, the present invention provides a system, method and program product for controlling web content usage. Specifically, under the present invention, a control tag is attached to web content at a content source to control use (e.g., distribution, dissemination, display, etc.) of the web content on a portal page. The control tag can be an exclusionary tag that prevents web content from being used, a set (i.e., one or more) of grouping tags that indicates how one or more sections of web content should be used, or a combination of both. Once attached, the control tag can be enforced in multiple ways. In one embodiment, clipper portlets within the portal program are adapted to obey the control tag. For example, the clipper portlet will not clip any web content that has an attached exclusionary tag. In another embodiment, an aggregator within the portal program will enforce the control tag. Specifically, the clipper portlet will "clip" the web content and its attached control tag. Once clipped, the aggregator within the portal program will detect and enforce the control tag. For example, any web content that has an attached exclusionary tag will be removed from the aggregation stream from which the portal page is derived.

According to a first aspect of the present invention, a method for controlling web content usage is provided. The method comprises: providing web content at a content source; and attaching a control tag to the web content at the content source to control use of the web content on a portal page.

According to a second aspect of the present invention, a system for controlling web content usage is provided. The system comprises a tagging system for attaching a control tag to web content at a content source, wherein use of the web content on a portal page is controlled based on the control tag.

According to a third aspect of the present invention, a program product stored on a recordable medium for controlling web content usage is provided. When executed, the program product comprises program code for attaching a control tag to web content at a content source, wherein use of the web content on a portal page is controlled based on the control tag.

Therefore, the present invention provides a method, system and program product for controlling web content usage.

BRIEF DESCRIPTION OF THE DRAWINGS

These and other features of this invention will be more readily understood from the following detailed description of the various aspects of the invention taken in conjunction with the accompanying drawings in which:

FIG. 4 depicts web content having an attached set of grouping tags according to another embodiment of the present invention.

FIG. 5 depicts web content having an attached set of grouping tags according to yet another embodiment of the present invention.

Figure 1:
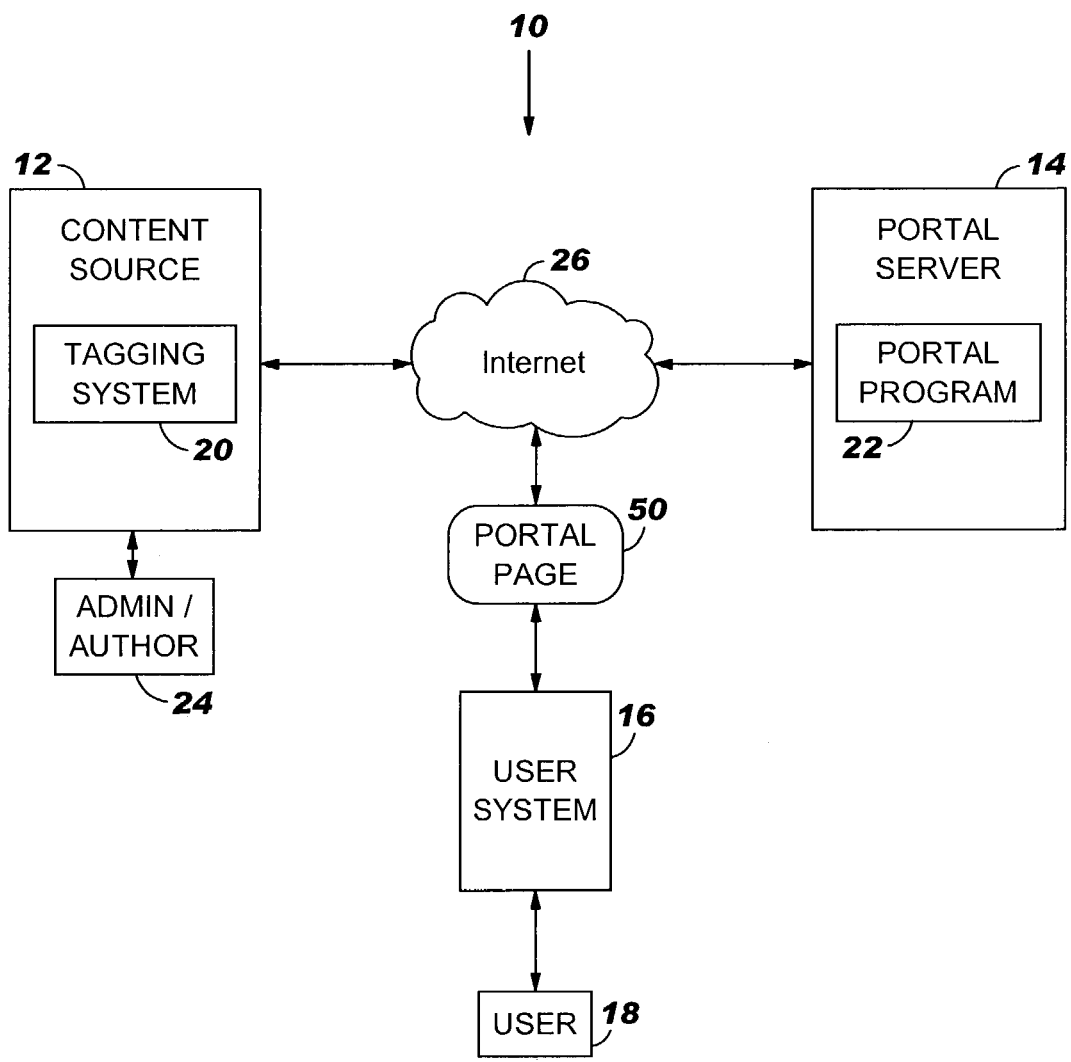
FIG. 1 depicts system for controlling web content usage according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a system, method and program product for controlling web content usage. Specifically, under the present invention, a control tag is attached to web content at a content source to control use (e.g., distribution, dissemination, display, etc.) of the web content on a portal page. The control tag can be an exclusionary tag that prevents web content from being used, a set (i.e., one or more) of grouping tags that indicates how one or more sections of web content should be used, or a combination of both. Once attached, the control tag can be enforced in multiple ways. In one embodiment, clipper portlets within the portal program are adapted to obey the control tag. For example, the clipper portlet will not clip any web content that has an attached exclusionary tag. In another embodiment, an aggregator within the portal program will enforce the control tag. Specifically, the clipper portlet will "clip" the web content and its attached control tag. Once clipped, the aggregator within the portal program will detect and enforce the control tag. For example, any web content that has an attached exclusionary tag will be removed from the aggregation stream from which the portal page is derived.

It should be understood in advance that as used herein, "web content" is intended to refer to any type of content that can be delivered over a network. To this extent, web content can include text, graphics, sounds, or any combination thereof. In addition, the teachings described herein can be implemented in conjunction with any "quantity" of web content. For example, the present invention can be used to control the use of an entire article, a single sentence, or a single word of web content.

Referring now to FIG. 1, a system 10 for controlling web content usage according to the present invention is shown. As known in the art, when user 18 requests a portal page 50 (e.g., his/her MY.YAHOO.COM page), a request will be transmitted from user system 16 to portal server 14 (e.g., over Internet 26). Upon receiving the request, one or more portlets (e.g., clipper portlets) within portal program 22 will clip/retrieve the necessary web content from one or more content sources (e.g., content source 12). As indicated above, a portal page typically includes multiple sections or visual portlets that each contain a specific type of web content (e.g., news, sports, weather, etc.) formatted according to user 18's preferences. To this extent, each type of web content could be obtained from a different content source. For example, if portal page 50 includes a visual portlet for weather, content source 12 could represent the National Weather Service. In any event, once the appropriate web content has been obtained, an aggregator within portal program 22 will aggregate the web content into an aggregation stream that is used to generate portal page 50 (according to user 18's preferences). Once portal page 50 is generated, it will be delivered to user system 16.

Under the present invention, tagging system 20 is provided for attaching one or more control tags to web content at content source 12. Specifically, prior to delivery of the web content to portal server 14, an administrator and/or content author 24 can attach one or more control tags to the web content. Once attached, the control tags will control (e.g., limit) the use of the web content on portal page 50. Under the present invention several different types of control tags can be attached to web content. One type of control tag is an exclusionary tag. Any web content to which an exclusionary tag is attached will not be useable on portal page 50. For example, if administrator/author 24 is working on an article that is intended for "paying customers" only, administrator/author 24 could attach an exclusionary tag thereto. Once attached, that article could not be used on portal page 50 (at least until the exclusionary tag is removed by administrator/author 24). Another type of control tag that can be attached to web content under the present invention is a set (i.e., one or more) of grouping tags that cause certain sections of web content to be used together on portal page 50. For example, if administrator/author 24 wishes a copyright notice to accompany an article, he/she could attach a set of grouping tags that would cause/force the article and the copyright notice to be grouped together.

It should be understood that although content source 12, portal server 14 and user system 16 are shown communicating over Internet 26, communication could actually occur in any known manner. That is, communication could occur via a direct hardwired connection (e.g., serial port), or via an addressable connection in a client-server (or server-server) environment that may utilize any combination of wireline and/or wireless transmission methods. In the case of the latter, the server and client may be connected via Internet 26, a wide area network (WAN), a local area network (LAN), a virtual private network (VPN) or other private network. The server and client may utilize conventional network connectivity, such as Token Ring, Ethernet, WiFi or other conventional communications standards. Where the client communicates with the server via Internet 26, connectivity could be provided by conventional TCP/IP sockets-based protocol. In this instance, the client would utilize an Internet service provider to establish connectivity to the server.

Figure 2:
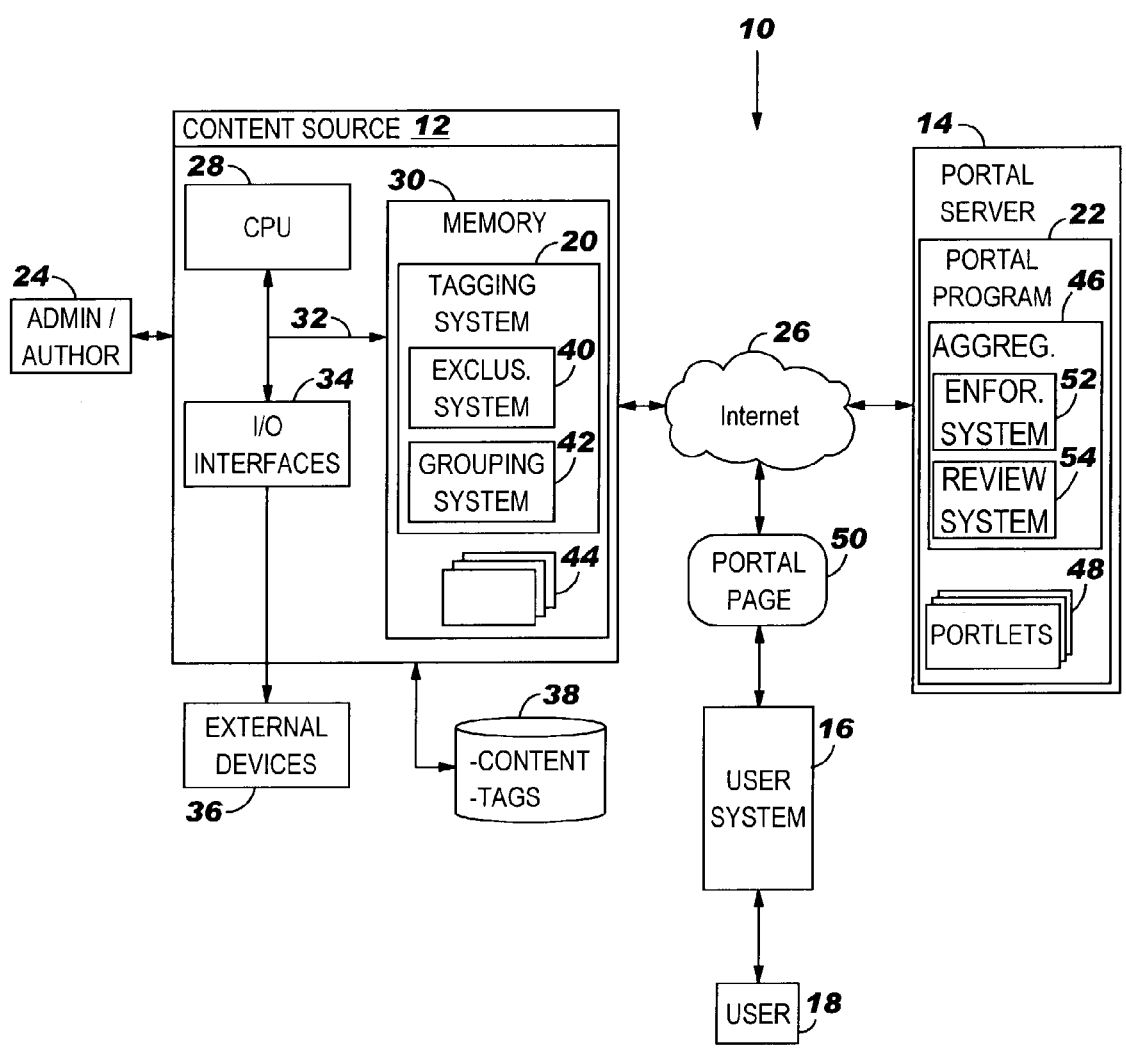
FIG. 2 depicts a more detailed view of the system of FIG. 1.

Referring now to FIG. 2, a more detailed diagram of system 10 is shown. As depicted, content source 12 generally includes central processing unit (CPU) 28, memory 30, bus 32, input/output (I/O) interfaces 34, external devices/resources 36 and storage unit 38. CPU 28 may comprise a single processing unit, or be distributed across one or more processing units in one or more locations, e.g., on a client and server. Memory 30 may comprise any known type of data storage and/or transmission media, including magnetic media, optical media, random access memory (RAM), read-only memory (ROM), a data cache, a data object, etc. Moreover, similar to CPU 28, memory 30 may reside at a single physical location, comprising one or more types of data storage, or be distributed across a plurality of physical systems in various forms.

I/O interfaces 34 may comprise any system for exchanging information to/from an external source. External devices/resources 36 may comprise any known type of external device, including speakers, a CRT, LED screen, hand-held device, keyboard, mouse, voice recognition system, speech output system, printer, monitor/display, facsimile, pager, etc. Bus 32 provides a communication link between each of the components in content source 12 and likewise may comprise any known type of transmission link, including electrical, optical, wireless, etc. In addition, although not shown, additional components, such as cache memory, communication systems, system software, etc., may be incorporated into content source 12.

Storage unit 38 can be any system (e.g., a database) capable of providing storage for web content and control tags under the present invention. As such, storage unit 38 could include one or more storage devices, such as a magnetic disk drive or an optical disk drive. In another embodiment, storage unit 38 includes data distributed across, for example, a local area network (LAN), wide area network (WAN) or a storage area network (SAN) (not shown). Storage unit 38 may also be configured in such a way that one of ordinary skill in the art may interpret it to include one or more storage devices.

It should be understood that although not shown, user system 16 and portal server 14 typically include computerized components (e.g., CPU, memory, etc.) similar to content source 12. Such components have not been depicted for brevity purposes only. Stored in memory 16 of content source 14 is tagging system 20 that includes exclusion system 40 and grouping system 42. Also stored are provider systems 44 that are intended to represent any system(s) now known or later developed that facilitate the delivery and/or management of web content.

Figure 3:
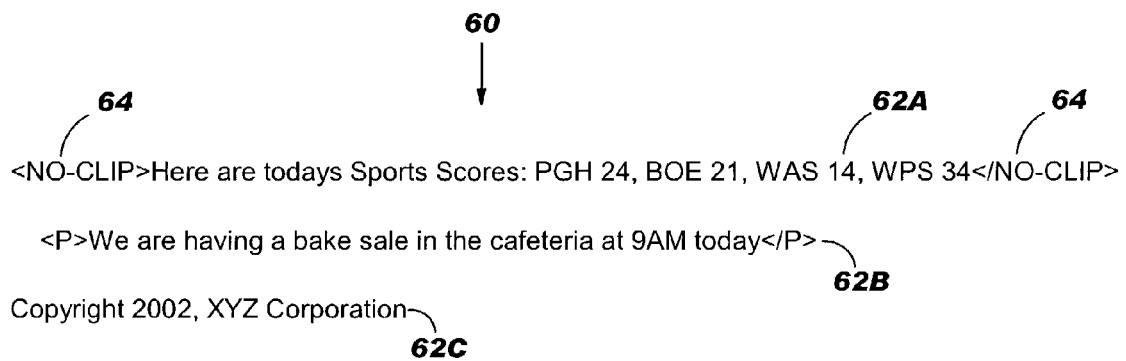
FIG. 3 depicts web content having an attached exclusionary tag according to one embodiment of the present invention.

Under the present invention, exclusion system 40 is used by administrator/author 24 to attach exclusionary tags to web content (i.e., to a piece/section of web content). As indicated above, web content having an attached exclusionary tag cannot be used on portal page 50. Referring to FIG. 3, an illustrative exclusionary tag 64 is shown. Specifically, FIG. 3 depicts a block of web content 60. As shown, web content 60 includes three "sections" of web content 62A-C. Web content section 62A includes sports scores, web content section 62B includes a bake sale notification, and while web content section 62C includes a copyright notice. It should be understood that the manner in which web content is divided into sections is not intended to be a limiting part of the present invention. That is, although each sentence or clause of web content 60 in FIGS. 3-5 is considered to be its own web content section, this need not be the case. For example, each word could be considered a different section. In any event, if administrator/author 24 wishes to prevent a certain web content section from being used on portal page 50, he/she can simply attach exclusionary tag 64 to that section. In the example shown in FIG. 3, administrator/author 24 has attached exclusionary tag 64 to web content section 62A (i.e., attached to the syntax). Accordingly, portal program 22 cannot use web content section 62A on portal page 50.

Referring back to FIG. 2, if administrator/author 24 wishes certain sections of web content to be used together on portal page 50, he/she can use grouping system 42 to attach one or more sets of grouping tags to the web content. FIG. 4 shows one way in which administrator/author 24 can attach a set of grouping tags to web content. As depicted, web content 60 has sets of grouping tags 66A-B and 68A-B attached thereto. Specifically, set of grouping tags 66A-B are considered "parent grouping tags." Any web content contained within a set of parent grouping tags 66A-B must be used together on portal page 50. Accordingly, since set of parent grouping tags 66A-B surround web content sections 62A-C, all three sections must be used together on portal page 50. As further shown in FIG. 4, a set of nested grouping tags 68A-B could also be attached. Set of nested grouping tags 68A-B are shown as surrounding section 62B. Under the present invention, nested grouping tags override parent grouping tags. That is, web content surrounded by nested grouping tags can be used separate from the other web content surrounded by parent grouping tags. Since web content section 62B is surrounded by set of nested grouping tags 68A-B, web content section 62B can be used alone, or apart from web content sections 62A and 62C. Accordingly, based on the sets of grouping tags shown in FIG. 4, either all three sections of web content 62A-C must be used together, or only section 62B must be used on portal page 50 (no other combinations or uses would be allowable).

Referring to FIG. 5, another manner of implementing grouping tags is shown. Specifically, under the embodiment shown in FIG. 5, a set of grouping tags can be attached to web content using a set of attributes 70A-C (e.g., identification tags) and a set of combination tags 72. Each attribute 70A-C individually identifies a section of web content 62A-C. As shown, attribute 70A identifies web content section 62A as clip group "1." Similarly, attribute 70B identifies web content section 62B as clip group "2." Still yet, attribute 70C identifies web content section 62C as clip group "3." Thus, each web content section is individually and uniquely identified. Once identified in this manner, set of combination tags 72 could be defined. Set of combination tags 70 identifies the precise manner in which web content sections 62A-C must be used on portal page 50 based on their attributes. For example, one of the combination tags is defined as "1,3." This means that web content sections 62A and 62C must be used together on portal page 50. Similarly, combination tag "2,3" dictates that web content sections 62B and 62C must be used together on portal page 50. Still yet, combination tag "1,2,3" dictates that web all three web content sections 62A-C must be used together on portal page 50. Accordingly, under the configuration of grouping tags set forth in FIG. 5, portal program 22 could use web content sections 62A-B together, web content sections 62A and 62C together, or all three web content sections 62A-C together on portal page 50, but no other combination. For example, none of the web content sections could be used alone. Moreover, web content sections 62A-B could not be used together without web content section 62C. If administrator/author 24 desired for other combinations to be allowable, or for a web content section to be used alone, he/she could achieve this simply by adding a combination tag to set 70. For example, if administrator/author 24 desired to allow the use of web content section 62B alone, he/she could do so by creating the combination tag of "2" within set 70.

Referring back to FIG. 2, the control tags (e.g., exclusionary tags or set(s) of grouping tags) that are attached to the web content will be complied with by portal program 22 in generating portal page 50. As depicted, portal program includes aggregator 46 and portlets 48. Under the present invention, enforcement of control tags can fall on either aggregator 46, portlets 48, or both. Specifically, in one embodiment, portlets 48 will review all web content at content source 12, and obey any control tags attached thereto. For example, portlets 48 will not clip/retrieve any web content having an attached exclusionary tag. Moreover, when encountering a set of grouping tags, portlets 48 will ensure that the web content is clipped/retrieved in accordance with the grouping requirements thereof. To this extent, portlets 48 are adapted to comprehend exclusionary tags, parent grouping tags, nested grouping tags, attributes and combination tags.

In another embodiment, enforcement of control tags rests with aggregator 46. Specifically, portlets 48 will clip/retrieve the requested web content and any attached control tags. Once retrieved, enforcement system 52 of aggregator 46 will detect and enforce any control tags attached to the web content. Typically, detection of an exclusionary tag will result in the removal of the corresponding web content from the aggregation stream that is used to generate portal page 50. Moreover, upon detecting a set of grouping tags, enforcement system 52 will ensure that the web content is used as directed. As described above, this could involve grouping certain sections of web content together on portal page 50. Review system 54 of aggregator 46 will analyze the control tags to detect any errors or misuse of the control tags. For example, a set of grouping tags could call for the grouping of two sections of web content whose combination is prohibited by company policies. Moreover, administrator/ author 24 could have incorrectly input a control tag (e.g., referred to an attribute that does not exist when creating a combination tag). In any event, review system 54 will detect the errors and limit the display of web content accordingly. To this extent, review system 54 could simply instruct enforcement system 52 to disregard the erroneous control tag(s). Alternatively, review system 54 could transmit a message to content source 12 requesting clarification and/or remedy of the error(s), prior to using the corresponding web content on portal page 50.

It should be understood that the present invention could be realized in hardware, software, or a combination of hardware and software. Any kind of computer/server system (s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for controlling web content usage, comprising:
   providing web content at a content source, wherein the web content comprises a plurality of sections of web content from a plurality of sources; and
   attaching a control tag to the web content at the content source to control use of the web content on a portal page, prior to delivery of the web content to a portal page server, wherein the attaching step comprises attaching at least one of:
      an exclusionary tag to the web content, wherein the exclusionary tag prevents the web content from subsequently being used on the portal page, or
      a set of grouping tags to the plurality of sections of web content, wherein the set of grouping tags comprises a set of parent grouping tags that causes at least two of the plurality of sections of web content to be used together on the portal page, and wherein set of grouping tags further comprises a set of nested grouping tags that allows one of the plurality of sections of web content to be used apart from the at least two of the plurality of sections on the portal page, further wherein the subsequent use of the web content with the attached control tag is independent of a type of device used to access web content.

2. The method of claim 1, wherein the use is selected from a group consisting of distribution and dissemination.

3. The method of claim 1, wherein the web content is clipped from content source in accordance with the control tag.

4. The method of claim 1, wherein use of the web content on a portal page is controlled based on the control tag.

5. A system recorded on a storage medium for controlling web content usage comprising a tagging system for attaching a control tag to web content at a content source, prior to delivery of the web content to a portal page server, wherein use of the web content on a portal page is controlled based on the control tag, wherein the web content comprises a plurality of sections of web content from a plurality of sources, wherein the tagging system comprises at least one of:
   an exclusionary tag to the web content, wherein the exclusionary tag prevents the web content from subsequently being used on the portal page, or
   a grouping system for attaching a set of grouping tags to the plurality of sections of web content, wherein the set of grouping tags comprises a set of parent grouping tags that causes at least two of the plurality of sections of web content to be used together on the portal page, further wherein the subsequent use of the web content with the attached control tag is independent of a type of device used to access web content.

6. The system of claim 5, wherein the use is selected from a group consisting of distribution and dissemination.

7. The system of claim 5, wherein the web content is clipped from content source in accordance with the control tag.

8. The system of claim 5, wherein use of the web content on a portal page is controlled based on the control tag.

9. A program product stored on a recordable medium for controlling web content usage, which when executed, comprises program code for attaching a control tag to web content at a content source, wherein use of the web content on a portal page is controlled based on the control tag, prior to delivery of the web content to a portal page server, wherein the web content comprises a plurality of sections of web content, wherein the program code for attaching comprises program code for attaching at least one of:
   an exclusionary tag to the web content, wherein the exclusionary tag prevents the web content from subsequently being used on the portal page, or
   a set of grouping tags to the plurality of sections of web content from a plurality of sources, wherein the set of grouping tags comprises a set of parent grouping tags that causes at least two of the plurality of sections of web content to be used together on the portal page, further wherein the subsequent use of the web content with the attached control tag is independent of a type of whether a hand held device used to access web content.

10. The program product of claim 9, wherein the use is selected from a group consisting of distribution and dissemination.

11. The program product of claim 9, wherein the web content is clipped from content source in accordance with the control tag.

12. The program product of claim 9, wherein the use is selected from a group consisting of distribution and dissemination.

* * * * *